Figure 1:
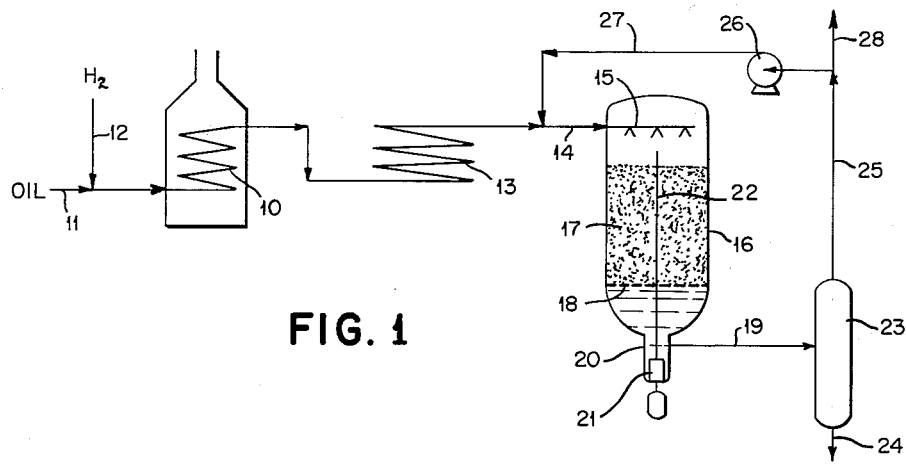

INVENTORS
PERCIVAL C. KEITH
EDWIN T. LAYNG

BY Paul W. Garbo

AGENT

United States Patent Office 2,987,467
Patented June 6, 1961

2,987,467
REMOVAL OF SULFUR AND METALS FROM HEAVY OILS BY HYDRO-CATALYTIC TREATMENT
Percival C. Keith, Peapack, and Edwin T. Layng, Summit, N.J., assignors to Hydrocarbon Research, Inc., New York, N.Y., a corporation of New Jersey
Filed May 26, 1958, Ser. No. 737,711
21 Claims. (Cl. 208—97)

This invention relates to the treatment of hydrocarbon oils with hydrogen in the presence of catalysts. More paraicularly, the invention is concerned with the treatment of heavy hydrocarbon oils to effect hydrodesulfurization.

Hydrodesulfurization has long been used to refine hydrocarbon oils and is a highly developed art insofar as the catalysts, temperatures, pressures and other process variables are concerned. Notwithstanding the extensive advances which have been made in hydrodesulfurization, the initial costs of suitable catalysts and the cost of regenerating such catalysts remain as important economic problems in the commercial utilization of hydrodesulfurization. Catalysts for the hydrodesulfurization of oils tend to become rapidly fouled with carbonaceous deposits and other contaminants in the charge stock, so that the activity of the catalyst can be maintained only by frequent regeneration of the catalyst. Regeneration of the catalyst necessitates interruption of the hydrodesulfurization operation or, as is more frequently the case, the provision of duplicate reactors so that while one reactor is on stream for the treatment of the charge stock, the other reactor is undergoing regeneration of the catalyst. In either case, the costs associated with the regeneration of the catalyst materially affect the economics of the hydrodesulfurization process. The frequency of catalyst regeneration is so increased when the charge stock is a heavy hydrocarbon oil that heretofore it has not been practical to refine such a heavy oil by the catalytic hydrodesulfurization process.

A principal object of this invention is to minimize the quantity of catalyst utilized and/or the frequency of regeneration of such catalyst in the hydrodesulfurization of heavy hydrocarbon oils.

Another important object is to effect hydrogenation of very heavy hydrocarbons to eliminate sulfur and produce lighter hydrocarbons without rapidly impairing the activity of the hydrogenation catalyst.

This and other objects and advantages of the invention will be apparent from the description which follows:

In accordance with this invention, the hydrodesulfurization of a heavy hydrocarbon oil is advantageously carried out in two successive steps involving, first, the cracking of the oil and, then, the catalytic hydrogenation of the cracked oil, while the oil is maintained largely in the liquid phase in both steps. The gist of the invention is the liquid-phase cracking of heavy hydrocarbons as a preparatory operation so that the sulfur present in such hydrocarbons is better exposed to and more reactive with hydrogen during subsequent liquid-phase catalytic hydrogenation.

The liquid-phase cracking of the oil is performed at elevated temperature and pressure. Suitable cracking temperatures fall in the range of about 700 to 1000° F. but frequently cracking temperatures of about 750 to 900° F. are preferred. Appreciable cracking of the charge stock is necessary in order to facilitate the elimination of sulfur in the subsequent hydrogenation step.

For the purpose of this invention, satisfactory cracking is effected when at least about 25% by volume of the fraction of the heavy oil or charge stock which boils above 900° F. is converted to hydrocarbons boiling below 900° F. The charge stocks contemplated for the process of this invention contain at least about 10% by volume of hydrocarbons boiling above 900° F.; it is in such high boiling hydrocarbons that sulfur is present in the form of very refractory compounds responding poorly to attack by hydrogen in conventional hydrodesulfurization processes. To crack at least 25% by volume of the hydrocarbon fraction boiling above 900° F. in any given charge stock, it has been found necessary to use hydrogen and/or finely divided solids like clay. The presence of hydrogen and/or fine solids apparently promotes deeper liquid-phase cracking of the charge stock than is practical in the absence thereof. Inasmuch as hydrogen must be present in the subsequent step of the process, it is highly advisable to take advantage of this hydrogen in the cracking step. In most cases, at least half of the hydrogen supplied to the catalytic hydrogenation zone is first passed through the cracking zone.

Comminuted solids with extended surfaces and preferably absorptive surfaces like clay, iron ore, alumina and silica gel help to achieve the desired degree of liquid-phase cracking of the heavy oil with or without the simultaneous use of hydrogen. With heavy oils which have troublesome contents of salts and complexes of metals like nickel and vanadium, it is preferred to use both hydrogen and finely divided solids in the cracking zone. While such ash-producing contaminants of oil may by the decomposition which occurs during cracking in the presence of hydrogen be rendered relatively harmless to the hydrogenation catalyst used in the subsequent step of the process, it is beneficial to have also fine solids present because the decomposed contaminants apparently tend to deposit on the solids and, hence, are even less likely to impair the activity of the hydrogenation catalyst subsequently contacted by the cracked oil. It is noteworthy that the cracking step of this invention, particularly when carried out with the aid of both hydrogen and comminuted solids, makes it possible to effect catalytic hydrodesulfurization of heavy oils with high contents of ash-forming contaminants such as vanadium complexes without the usual rapid loss of activity of the hydrogenation catalyst. This rapid loss of catalyst activity has seriously deterred the commercial refining of highly contaminated oils by prior catalytic hydrodesulfurization processes.

The oil, after undergoing liquid-phase cracking in the first step of the process of this invention, is subjected to catalytic hydrodesulfurization. While the hydrodesulfurization art is well developed and may be followed in carrying out the second step of this process, satisfactory results are obtained when operating at a temperature in the range of about 650 to 850° F., preferably 750 to 830° F., and a pressure in the range of about 500 to 5000 pounds per square inch gauge (p.s.i.g.), preferably 1500 to 3000 p.s.i.g.

Any sulf-active hydrogenation catalyst may be used in the hydrodesulfurization step of this invention. Among the more prominent catalysts which may be used are cobalt molybdate deposited on alumina, tungsten sulfide and the mixed oxides of iron and chromium.

The hydrogen which is supplied to the reaction system is usually in the form of a gaseous stream containing other constituents such as carbon oxides, nitrogen, methane, ethane and steam. For hydrodesulfurization, the hydrogen-containing gas introduced into the catalytic hydrodesulfurization zone is adjusted to provide usually at least 250 cubic feet (standard conditions) of hydrogen for each barrel of charge stock undergoing treatment. Preferably, hydrogen is supplied at a rate in the range of about 500 to 2000 cubic feet per barrel of charge stock entering the catalytic hydrodesulfurization zone.

As brought out in the copending application Serial No. 457,839, filed September 23, 1954, by H. R. Pichler, now U.S. Patent 2,910,433, hydrodesulfurization is advantageously carried out with a substantial recycling of the treated oil. While a recycling rate of 2 volumes of treated oil per volume of charge stock is beneficial, recycling rates in the range of about 10:1 to 20:1 are particularly desirable. With the recycling of treated oil, it is expedient to recycle also hydrogen leaving the catalytic hydrodesulfurization zone. The recycled hydrogen when added to fresh hydrogen supplied to the hydrodesulfurization zone corresponds to a total of approximately 1,000 to 10,000 cubic feet per barrel of the charge stock entering the hydrodesulfurization zone.

To facilitate understanding of the present invention further, reference is now made to the accompanying drawings which diagrammatically represent typical flowsheets embodying the two-step process of the invention.

FIGURE 1 shows a furnace containing a preheating coil 10. The charge stock or heavy oil is supplied by line 11 to coil 10 after being admixed with hydrogen-containing gas introduced by way of line 12. In starting up the operation, the stream in coil 10 is heated sufficiently to initiate the exothermic hydrocracking reaction. Thereafter, the oil and hydrogen stream is only preheated in coil 10 to a temperature, say about 600° F., which will permit the exothermic hydrocracking reaction to proceed in cracking coil 13 at the desired temperature level without further temperature control. The liquid-phase cracked oil together with the hydrogen-containing gas phase passes from coil 13 through line 14 to distributor 15 in the top of catalytic reactor 16 which contains a bed 17 of sulf-active catalyst particles supported by perforated plate 18. The mixture of liquid and gas phases passes downwardly through catalyst bed 17 leaving reactor 16 through line 19. Part of the liquid phase collecting in the sump 20 at the bottom of reactor 16 is recycled to the top of catalyst bed 17 by means of pump 21 and standpipe 22. The mixed phases passing through line 19 discharge into separator 23 whence the treated oil is removed by way of line 24 while hydrogen-containing gases flow through line 25. A substantial portion of the gases flowing through line 25, after vaporized hydrocarbons have been recovered therefrom, are recycled by means of blower 26 and lines 27 and 14 to reactor 16. The remainder of the gases are removed from the reaction system by way of line 28. Catalytic reactor 16 of FIGURE 1 and its operation are described in greater detail in the aforesaid application of Pichler.

Figure 2:
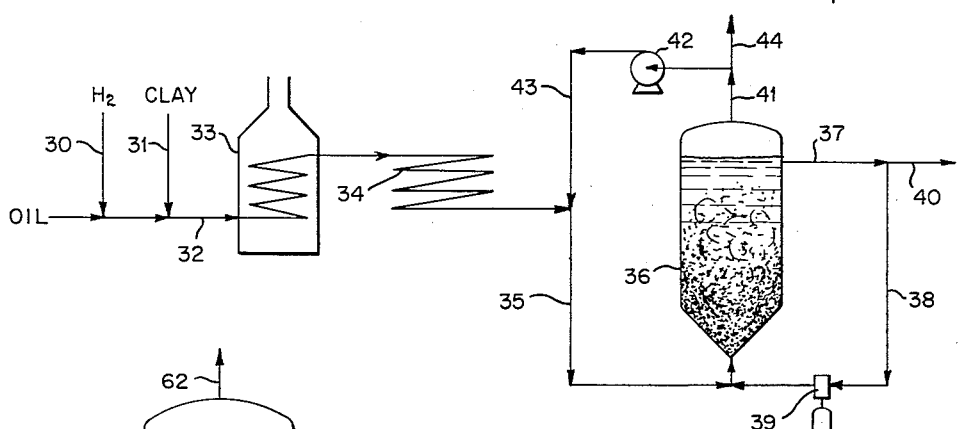

FIGURE 2 shows the introduction of hydrogen-containing gas and clay by lines 30 and 31, respectively, into line 32 which supplies the charge stock to preheater 33 and thence to cracking coil 34. The clay is carried in suspension by the oil admixed with hydrogen-containing gas. The slurry of clay and cracked oil together with hydrogen-containing gas passes from coil 34 through line 35 into the bottom of reactor 36, containing a mass of sulf-active hydrogenation catalyst particles. The rate of flow of the liquid phase upwardly through reactor 36 is sufficiently high to suspend the catalyst particles with a random movement but insufficient to carry these particles out of reactor 36. The technique of causing random movement of particulate masses by the upward flow of a liquid is called ebullation in the copending application of E. S. Johanson, Serial No. 743,304, filed June 20, 1958, which describes this technique in detail. The oil-clay slurry leaves reactor 36 by way of line 37 at a level where the liquid phase in reactor 36 is substantially free of the ebullated catalyst particles. A large portion of the withdrawn oil-clay slurry is recycled to reactor 36 by means of line 38 and pump 39. The remainder of the slurry leaves the reaction system through line 40 and is then suitably processed to separate the clay therefrom and to fractionate the treated oil as may be desired. The gas phase leaves reactor 36 through line 41. A substantial portion of the gasiform effluent from reactor 36, after normally liquid hydrocarbons have been separated therefrom, is recycled by means of blower 42 and lines 43 and 35 to the bottom of reactor 36. The remainder of the gasiform effluent of reactor 36 is withdrawn from the reaction system through line 44 and treated to condense and separate vaporized gasoline and other hydrocarbons produced by the process.

Figure 3:
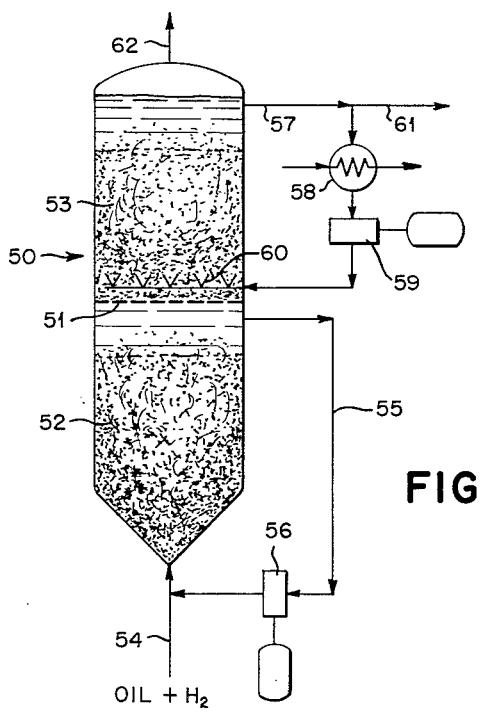

FIGURE 3 is a diagrammatic representation of unitary apparatus for carrying out the two-step process of this invention. Cylindrical vessel 50 is divided by perforated plates 51 into lower cracking section 52 and upper hydrodesulfurization section 53. A suitably preheated mixture of heavy oil and hydrogen-containing gas flows through line 54 into the bottom of cracking section 52. The hydrocracked oil and gas rising through section 52 pass through perforated plate 51 into section 53 containing a sulf-active hydrogenation catalyst. It is frequently desirable to have a mass of particulate solids, e.g., alumina or silica, present in lower section 52 to facilitate or catalyze the liquid-phase hydrocracking of the charged oil. In such case, the particulate mass is preferably maintained in an ebullated state with the aid of a recycle stream of the hydrocracked oil. The recycle stream leaves the upper part of section 52 through line 55 and is injected by pump 56 into line 54 discharging into the bottom of section 52. The mass of solids in the bottom of section 52 is expanded by ebullation but even so the highest level reached by the moving particles of the ebullated mass is well below the level at which liquid leaves section 52 through line 55 for recycling.

The mixture of liquid and gas, passing through perforated plate 51 after the heavy oil has been hydrocracked, continues to flow upwardly through section 53 in contact with a mass of sulf-active hydrogenation catalyst. Again, it is preferable to maintain this mass of catalyst in section 53 in an ebullated condition and, for this purpose, liquid from the upper part of section 53 is recycled to the lower part thereof. This recycle stream of oil which has been subjected to hydrodesulfurization passes through line 57, heat exchanger 58, pump 59 and distributor 60 whence the recycle stream of hydrodesulfurized oil discharges into the ascending flow of hydrocracked oil from section 52. The ebullated catalyst particles in section 53 do not rise to the level at which liquid is withdrawn through line 57. Part of the product oil is taken from the treating system by line 61 and sent to a fractionator for recovering desired hydrocarbon fractions. A gasiform effluent leaves section 53 through line 62; vaporized hydrocarbons and hydrogen are recoverable from this effluent. The recovered normally liquid hydrocarbons, i.e., those having four or more carbon atoms in the molecule, are part of the total product oil obtained by the process of this invention.

To illustrate the invention still further, a specific exemplary operation of each of the systems shown in FIGURES 1, 2 and 3 will now be given.

Referring to FIGURE 1, a Kuwait residuum having a gravity of 9° API, a sulfur content of 5.2% by weight and over 95% by volume of hydrocarbons boiling above 900° F. is charged into cracking oil 13 together with a hydrogen-rich gas providing 1250 cubic feet of hydrogen for each barrel of the residuum. The mixture of hydrogen and residuum substantially in the liquid phase passes through coil 13 at a temperature of about 820° F. and a pressure of about 3000 p.s.i.g. Approximately 60% by volume of the hydrocarbons originally boiling above 900° F. are converted to hydrocarbons boiling below 900° F. by the passage of the residuum through cracking coil 13.

The thus cracked oil together with a gaseous phase rich in unconsumed hydrogen flows directly from coil 13 through line 14 into catalytic reactor 16 containing a catalyst bed of cobalt molybdate on alumina granules (4 to 8 mesh). The cracked oil substantially in liquid phase trickles down through the catalyst bed in intimate contact with the hydrogen-containing gas which is also passing down through the catalyst bed. Treated oil is internally recycled by pump 21 and standpipe 22 to the top of reactor 16 at a rate corresponding to 10 barrels per barrel of cracked oil charged into reactor 16 by line 14. The gaseous effluent of reactor 16 is also recycled by blower 26 at a rate so that the total of the hydrogen in the effluent of coil 11 and in recycle line 27 corresponds to 7000 cubic feet per barrel of cracked oil entering reactor 16. The temperature in reactor 16 is maintained at about 810° F. and the pressure at approximately 3000 p.s.i.g.

At the end of the first day of operation, the total product oil of the system has a gravity of 29.5° API and a sulfur content of 0.6% by weight. This product oil has a fraction of hydrocarbons boiling above 900° F. amounting to only approximately 10% by volume. In 40 days of continuous operation, the hydrogenation catalyst shows tolerable loss of activity; at this point, the product oil has a gravity of 28.8° API, a sulfur content of 0.7% by weight and a hydrocarbon fraction boiling above 900° F. of about 12% by volume.

In contrast to this example of the invention, when the same residuum is charged directly into reactor 16 and the aforesaid operating conditions are maintained with respect to reactor 16, the treated oil at the end of the first day of operation has a gravity of 25.6° API, a sulfur content of 0.8% by weight and a hydrocarbon fraction boiling above 900° F. amounting to 25% by volume. After 40 days of continuous operation without precracking the residuum, the catalyst shows further significant decline of activity so that the treated oil at this point has a gravity of 22.1° API, a sulfur content of 1.3% by weight and a hydrocarbon fraction boiling above 900° F. of 35% by volume.

Thus, precracking the residuum not only leads to better sulfur elimination and higher conversion of non-distillate hydrocarbons (i.e., those not boiling at 900° F. or lower) to distillate hydrocarbons (i.e., those boiling at 900° F. or lower), but also maintains the hydrogenation catalyst activity at a high level over an extended period of operation. Furthermore, the treated product obtained with precracking of the residuum is superior to the product without precracking in other respects, such as the stability and diesel index of the furnace oil fraction of the product.

Referring to FIGURE 2, Boscan crude with a gravity of 10.2° API and a sulfur content of 5.3% by weight is supplied to cracking oil 34 together with sufficient hydrogen-containing gas to provide 800 cubic feet of hydrogen for each barrel of crude. Clay is suspended in the crude prior to entering coil 34 in the proportion of 1 pound per barrel of crude which contains approximately 1140 parts per million of vanadium in the form of porphyrin complexes. The clay serves during liquid-phase cracking of the crude to destroy more thoroughly the vanadium complexes and thus to minimize the poisoning of the hydrogenation catalyst by these complexes in the subsequent hydrodesulfurization step. The cracking step is performed at about 830° F. and 3000 p.s.i.g. to convert approximately 50% of the large volume of hydrocarbons in the crude originally boiling above 900° F. to hydrocarbons boiling at 900° F. or lower.

The total effluent of cracked oil, clay and gas flows from coil 34 through line 35 into reactor 36 containing a mass of 12 to 16 mesh particles of alumina supporting cobalt molybdate. Treated oil leaves the upper part of reactor 36 through line 37; the portion of treated oil which is recycled to reactor 36 by line 38 and pump 39 corresponds to 20 volumes for each volume of cracked oil flowing into reactor 36 by way of line 35. The combined upward flow of recycled oil and charged oil from cracking coil 34 is at the rate of 25 gallons per minute per square foot of horizontal cross-section of reactor 36 and at this flow rate the catalyst particles are randomly buoyed and moved by the flowing oil. The ebullated catalyst particles give intimate contact to the reactants, provide temperature uniformity throughout reactor 36, offer extremely little resistance to the flow of the reactants through reactor 36 and remain active for hydrodesulfurization over an extended operating period.

Reactor 36 is operated at 820° F. and nearly 3000 p.s.i.g. with gasiform effluent recycling through blower 42 and line 43 at a rate to provide with the hydrogen leaving coil 34 a total of 3500 cubic feet of hydrogen for each barrel of cracked oil passing from coil 34 to reactor 36. Part of the gasiform effluent from reactor 36 is continuously withdrawn through line 44 for the recovery of vaporized and normally gaseous hydrocarbons as well as hydrogen which may be utilized in cracking coil 34.

Treated oil withdrawn through line 40 is filtered to separate suspended clay therefrom and, after being combined with the normally liquid hydrocarbons recoveded from the gasiform effluent, exhibits a gravity of 27.3° API and a sulfur content of 0.7% by weight. The small fraction of hydrocarbons in the product oil boiling above 900° F. indicates that 85% by volume of the hydrocarbons in the crude originally boiling above 900° F. have been converted to lower boiling hydrocarbons. The separated clay may be returned to coil 34, preferably, recycled clay is periodically regenerated by burning off material deposited thereon.

After 10 days of continuous operation, the treated oil still shows 85% by volume conversion of the hydrocarbons in the crude originally boiling above 900° F. to lower boiling hydrocarbons. At this point, the treated oil has a gravity of 26.8° API and a sulfur content below 0.8% by weight.

However, when the foregoing operation is repeated except that cracking oil 34 is omitted, the treated oil initially has a gravity of 25.4° API and a sulfur content slightly over 0.8% by weight. After 10 days of operation, the gravity of the treated oil is only 22.1° API and its sulfur content jumps to 2.5% by weight. In this period, the conversion of hydrocarbons boiling above 900° F. to lower boiling hydrocarbons falls off from a starting value of 75% by volume to a final value of 70%.

In the operation of the apparatus of FIGURE 3, a Mid-Continent residuum and hydrogen-containing gas are charged through line 54. The residuum is essentially all hydrocarbons boiling above 900° F. and has a gravity of 13.8° API, a sulfur content of 1.24% by weight and a Ramsbottom carbon residue of 12% by weight. The pressure in vessel 50 is 2500 p.s.i.g. A mass of quartz ships (8 to 10 mesh) is maintained in an ebullated state in cracking section 52 by the upward flow of oil therethrough. While the charge stock is supplied at a preheat temperature of 700° F., the cracking temperature in section 52 is kept at 890° F. Cracked oil is circulated by line 55 and pump 56 at a rate of 12 volumes per volume of charged residuum; the combined flow of recycled oil and charge stock is 50 gallons per minute per square foot of horizontal cross-section of section 52. Hydrogen is supplied at the rate of 950 cubic feet per barrel of charge stock but hydrogen in the gasiform effluent from outlet line 62 is recycled by way of line 54 so that the total hydrogen entering vessel 50 corresponds to 7000 cubic feet per barrel of charged residuum.

The cracked oil and gases passing through perforated plate 51 contact a mass of ebullated catalyst particles (8 to 12 mesh). The catalyst is cobalt molybdate deposited on silica-stabilized alumina. The temperature in section 53 is held at 760° F. by recycling slightly cooled treated oil through line 57, cooler 58 and pump 59 at the rate of 12 volumes of recycle for each volume of charge stock. The total upward flow of liquid through section 53 is about 50 gallons per minute per square foot of horizontal cross-section of section 53.

Over an operating period of 50 days, the treated oil recovered from the top of vessel 50 shows insignificant variations in the following initial results: gravity of 26° API, sulfur content of 0.34% by weight, Ramsbottom carbon residue of 5.6% by weight and 66% by volume conversion of the original high boiling hydrocarbons to hydrocarbons boiling not in excess of 900° F.

In the light of experience, these results indicate that operation for periods of at least six months without product deterioration are to be expected and operating periods of even a year or more are possible, particularly when a slight decrease in results is tolerable.

It is evident that the process of the invention is particularly valuable in the refining of heavy oils with gravities below about 30° API and especially below 20° API. While such heavy oils usually contain at least 10% by volume of hydrocarbons boiling above 900° F., these high boiling hydrocarbons are frequently in excess of 20% by volume of the heavy oil or charge stock. Very heavy oils with gravities of 15° API or lower and containing 80% by volume or higher of hydrocarbons boiling above 900° F. can be successfully refined by the process of this invention whereas no other known hydrodesulfurization process is operable with such very heavy oils for any period that could be considered commercially feasible.

As is known in petroleum testing, the determination of hydrocarbons boiling at temperatures above 600° F. is made under reduced pressure. All references herein to hydrocarbons boiling above 600° F. are therefore intended to have been determined under reduced pressure.

Many modifications of the illustrative embodiment of the invention will occur to those skilled in the art. For instance, all or part of the hydrogen recycled by blower 26 and line 27 in FIGURE 1 may be introduced into the oil stream before cracking coil 13 rather than after coil 13. In such case, fresh or make-up hydrogen, shown as injected into the oil stream ahead of preheater 10, may be introduced into line 14. In FIGURE 2, the hydrogen of line 30 may be injected into the bottom of reactor 36. In view of the various modifications of the invention which may be made without departing from the spirit or scope thereof, only such limitations should be imposed as are indicated by the appended claims.

What is claimed is:

1. A process for refining a sulfur-containing heavy oil having at least 10% by volume of hydrocarbons boiling above 900° F., which comprises cracking said oil while substantially in the liquid phase to convert at least 25% by volume of said hydrocarbons boiling above 900° F. to hydrocarbons boiling below 900° F., and thereafter reacting the thus cracked oil while substantially in the liquid phase with hydrogen in the presence of particulate sulf-active hydrogenation catalyst to effect sulfur elimination.

2. The process of claim 1 wherein said oil is cracked in the presence of hydrogen at a temperature in the range of 700 to 1000° F.

3. The process of claim 2 wherein the thus cracked oil is reacted with hydrogen at a pressure in the range of 500 to 5000 p.s.i.g. and a temperature not exceeding about 850° F.

4. The process of claim 1 wherein said oil contains ash-forming contaminants and is cracked in the presence of hydrogen and comminuted solids at an elevated pressure not exceeding about 3000 p.s.i.g.

5. The process of claim 1 wherein the particulate catalyst is maintained in random motion in the liquid phase.

6. A process for refining a sulfur-containing heavy oil having at least 10% by volume of hydrocarbons boiling above 900° F., which comprises passing said oil while substantially in the liquid phase and hydrogen through a hydrocracking zone to convert at least 25% by volume of said hydrocarbons boiling above 900° F. to hydrocarbons boiling below 900° F., and thereafter continuing in a hydrodesulfurization zone the reaction of hydrogen with the thus hydrocracked oil while substantially in the liquid phase in the presence of particulate sulf-active hydrogenation catalyst.

7. The process of claim 6 wherein the hydrocracking and hydrodesulfurization zones are maintained at temperatures in the ranges of 750 to 900° F. and 650 to 850° F., respectively, both of said zones being maintained at an elevated pressure not exceeding about 5000 p.s.i.g.

8. The process of claim 7 wherein the particulate catalyst comprises cobalt molybdate and is maintained in random motion in the liquid phase.

9. The process of claim 7 wherein part of the liquid phase passed through the hydrodesulfurization zone is recycled for passage again through said hydrodesulfurization zone.

10. The process of claim 9 wherein part of the liquid phase through the hydrocracking zone is recycled for passage again through said hydrocracking zone.

11. The process of claim 10 wherein the sulfur-containing heavy oil has at least 80% by volume of hydrocarbon boiling above 900° F.

12. A process for refining a heavy oil containing compounds of sulfur and a metallic element and having at least 20% by volume of hydrocarbons boiling above 900° F., which comprises passing said oil, while substantially in the liquid phase and while absorptive comminuted solids are suspended in said liquid phase, through a cracking zone maintained at a temperature not exceeding about 1000° F. to convert at least 25% by volume of said hydrocarbons boiling above 900° F. to hydrocarbons boiling below 900° F., and thereafter passing the thus cracked oil while substantially in the liquid phase with hydrogen through a hydrodesulfurization zone containing a mass of particulate sulf-active hydrogenation catalyst.

13. The process of claim 12 wherein the comminuted solids suspended in the liquid phase are carried through the hydrodesulfurization zone while the particulate catalyst is maintained therein in random motion.

14. The process of claim 12 wherein at least part of the hydrogen passed through the hydrodesulfurization zone is also passed through the cracking zone.

15. The process of claim 14 wherein the particulate catalyst comprises cobalt molybdate and the hydrodesulfurization zone is maintained at a temperature not exceeding about 850° F. and a pressure not exceeding about 3000 p.s.i.g.

16. The process of claim 12 wherein part of the liquid phase passed through the hydrodesulfurization zone is recycled for passage again through said hydrodesulfurization zone.

17. The process of claim 16 wherein the liquid phase is recycled at a rate to maintain the particulate catalyst in the hydrodesulfurization zone in random motion.

18. The process of claim 17 wherein part of the liquid phase passed through the cracking zone is recycled for passage again through said cracking zone at a rate to maintain the comminuted solids in said cracking zone in random motion.

19. A process for refining a heavy hydrocarbon oil at least 10% of which boils above about 900° F. and contains at least 1 wt. percent sulfur and at least 25 p.p.m. of metals as metal-organic compounds which comprises passing the oil substantially in liquid phase through a reaction zone in the presence of a hydrogen containing gas to convert at least 25% by volume of the oil boiling above about 900° F. into oil boiling below 900° F. and to render the ash producing contaminants relatively harmless to the subsequent hydrogenation step, and thence passing said oil while still substantially in the liquid phase and admixed with hydrogen containing gas upwardly through a second reaction zone containing a bed of particulate sulf-active hydrogenation catalyst under a hydrogen pressure in the order of 750–3000 p.s.i.g., and temperatures in the range of 750–1000° F., withdrawing a liquid from the upper part of said second reaction zone and recycling a portion of said liquid with the oil feed to the said second reaction zone in the range of 2 to 20 volumes of treated oil per volume of charge to obtain a rate of linear flow of liquid through the reaction zone, based on the particulate solid size and density and the fluid density, whereby the bed is expanded so that the particulate solids are maintained in random motion and not to exceed a rate at which the particulate solids will be carried out of the reaction zone.

20. A process as claimed in claim 19 wherein the first reaction zone contains a bed of particulate solids and the liquid feed in the presence of hydrogen containing gas passes upwardly through the bed, withdrawing a liquid from the upper part of the first reaction zone and recycling a portion of said liquid with the oil feed to the said first reaction zone in the range of 2 to 20 volumes of treated liquid per volume of charge to obtain a rate of linear flow of liquid through the reaction zone based on the particulate solid size and density and the fluid density, so that the bed is expanded and the particulate solids are maintained in random motion but not to exceed such a rate that the particulate solids will be carried out of the reaction zone.

21. A process as claimed in claim 20 wherein the particulate solids in the first reaction zone are from the group of alumina and silica to catalyze the liquid phase hydrocracking of the charged oil.

References Cited in the file of this patent

UNITED STATES PATENTS

| | | |
|---|---|---|
| 2,801,208 | Horne et al. | July 30, 1957 |
| 2,787,582 | Watkins et al. | Apr. 2, 1957 |
| 2,888,393 | Ballard et al. | May 26, 1959 |